Oct. 29, 1940.　　　M. ANDIS　　　2,219,552

ELECTRIC MOTOR ASSEMBLY

Filed April 30, 1938　　　2 Sheets-Sheet 1

INVENTOR.
MATHEW ANDIS

BY

Wheeler, Wheeler & Wheeler
ATTORNEYS

Oct. 29, 1940.   M. ANDIS   2,219,552

ELECTRIC MOTOR ASSEMBLY

Filed April 30, 1938   2 Sheets-Sheet 2

INVENTOR.
MATHEW ANDIS

BY
Wheeler, Wheeler + Wheeler
ATTORNEYS

Patented Oct. 29, 1940

2,219,552

UNITED STATES PATENT OFFICE 2,219,552

ELECTRIC MOTOR ASSEMBLY

Mathew Andis, Racine, Wis.

Application April 30, 1938, Serial No. 205,256

19 Claims. (Cl. 172—36)

My invention relates to improvements in electric motor assemblies, with particular reference to motors for operating vibrators at high frequency for hair clipping, shaving clipping and massaging purposes, but also adapted for various other uses.

Objects of my invention are to provide a compact motor, operable by either direct or alternating current, reversible and operative with equal efficiency in either direction, instantly responsive to a starting impulse, and capable of developing vibratory movements of high frequency and maximum power in proportion to the weight of the motor.

A further object is to provide an improved three-pole motor of greater efficiency for vibrating purposes, and capable of producing sharper strokes of a reciprocated member or lever than any motors heretofore employed for similar purposes.

A further object is to provide such a motor with a non-arcing circuit breaker, or one in which arcing is reduced to a minimum in proportion to the developed energy.

A further object is to provide an improved assembly of a motor carrying handle or casing, motor, motor starter, circuit breaker, and power transmitting member or lever, whereby increased vibrating efficiency can be attained.

In the drawings.

Like parts are identified by the same reference characters throughout the several views.

Figure 1:
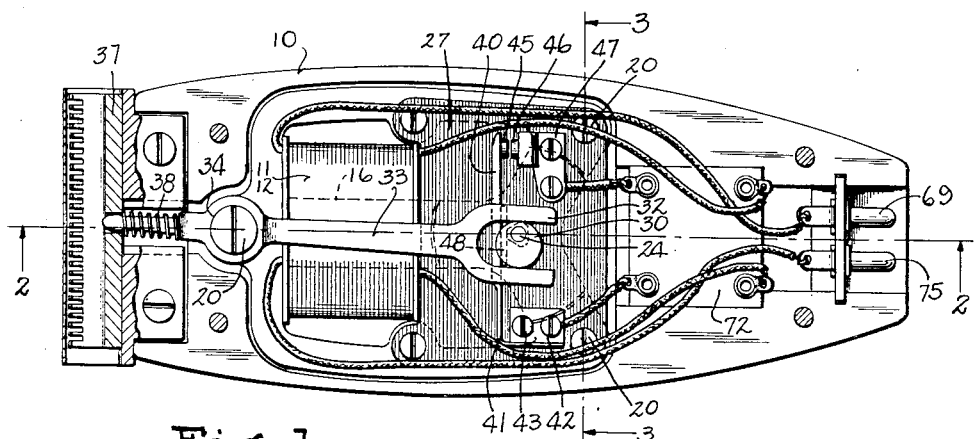
Figure 1 is a plan view of my improved motor as it appears when installed in the handle of a hair clipping device, the handle cap being removed to expose the motor.

In the embodiment shown in the drawings, the motor is mounted within a hollow handle 10, which contains a set of concentric field coils 11 and 12 (Figure 2), a three-pole armature having its arms 13 provided with arcuate polar faces equi-distant from each other, and a field magnet having a central core bar 16 provided with an arcuate polar face or extremity 17 at one end and the other end extended around the field coils in horseshoe form, and provided with polar extremities 18 equi-distant from each other and from the extremity 17 and arcuately faced in a circle concentric to the arcuate polar faces of the armature arms 13.

The armature and the field magnet are preferably composed of laminated plates. Those of the field magnet are connected by screws 20 with the bottom portion of the casing 10. The latter is preferably formed of Bakelite or equivalent dielectric material and provided with interior mounting shoulders 22, in which metallic nuts 23 may be embedded, and into which the screws 20 are threaded. The armature shaft 24 is vertically disposed and mounted in bearing blocks 25 and 26 carried by the Bakelite mounting plates 27. The bearing blocks have pressed fit relationship to the mounting plates 27, whereas the motor shaft 24 has pressed fit relationship to the concentric plates of the armature, whereby the armature and its shaft rotate as a unit. The armature plates are connected with each other by any suitable means to prevent relative rotation. The bearing blocks are preferably socketed in the armature, whereby to provide elongated bearings without undue vertical extension beyond the mounting plates.

At its upper end the armature shaft 24 is provided with an eccentric 30 which is fixed to the reduced upper end of the armature shaft 24 and rotates between the fork arms 32 of a vibrator lever 33, pivoted at 34 to the forward bolt or screw 20. In the construction shown, the forked end of the lever 33 vibrates directly underneath the removable handle cap 35.

A downwardly offset portion is pivoted to the bolt or screw 20, and the power arm of the lever is additionally offset in a downward direction and extended through an opening 36 in the front end of the handle to a vibratory member 37.

In the structure illustrated, the vibratory member 37 may be assumed to be the cutter bar of a hair clipper operating within a cylindrical bore formed in a suitable shear bar. The shear bar may also be of ordinary construction. A compression spring 38 is coiled about the portion of the lever 33 which extends through the opening 36, and the short arm of the lever is loosely socketed in the cutter bar. The spring holds the cutter bar in pressure contact with the working portions of the shear bar.

Figure 2:
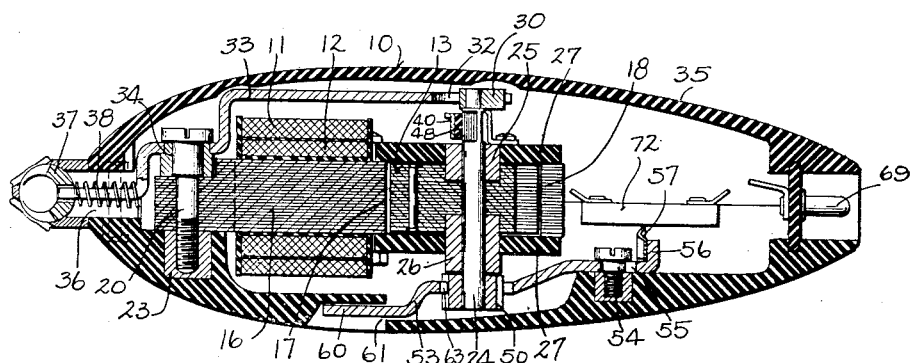
Figure 2 is a sectional view drawn to line 2—2 of Figure 1.
Figure 3:
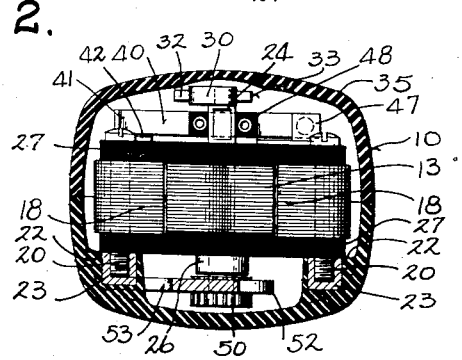
Figure 3 is a sectional view drawn to line 3—3 of Figure 1.

A circuit breaker arm 40 is mounted upon a resilient support or spring 41, having an angle-shaped extremity or bracket 42 secured to the Bakelite mounting plate 27 by screws 43. The supporting spring 41 and the circuit breaker arm 40 are preferably formed integrally with the bracket 42, and the portion referred to as the arm 40 may be stiffened by bending the upper margin of the plate 41 forwardly, as shown in Figure 2, for reenforcing purposes. The free extremity of the arm 40 is provided with a contact button 45 adapted for registry with a fixed contact 46 connected with a supporting bracket 47.

The periodicity of the spring 41 allows the arm 40 to vibrate in correspondence to the speed of the motor.

The motor shaft 24 is triangular in form between the bearing block 25 and the eccentric 30. The arm 40 has a Bakelite wear plate 48 which bears upon the triangular or cam-shaped portion of the shaft, whereby, when the shaft rotates, the arm 40 will be swung to the circuit breaking or Figure 1 position three times during each shaft revolution.

For starting the motor I provide the lower end of the motor shaft 24 with a pinion 50, loosely received in an oval-shaped slot 51, formed in an enlarged central portion 52 of a starting lever 53. This starting lever has one end loosely pivoted to a stud 54 which projects upwardly from the bottom wall of the handle or casing. The lever has a slot 55 to receive the stud 54, and it also has a hook-shaped extremity 56 which engages a flat spring 57, the ends of which are anchored in the Bakelite shoulders of said handle wall.

Figures 5, 6:
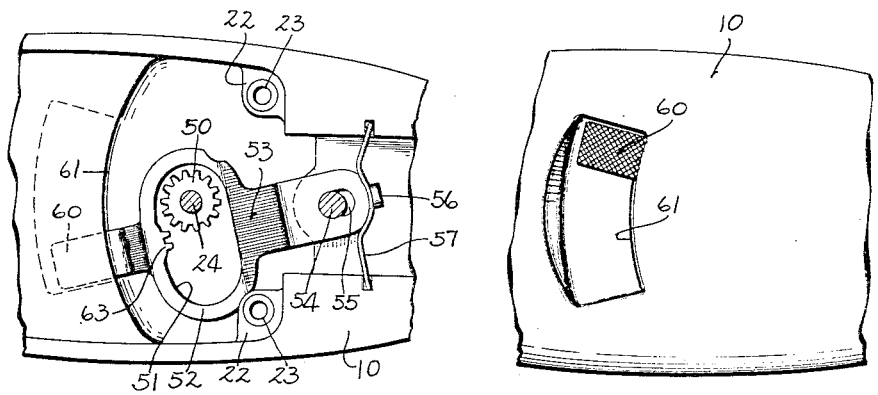
Figure 5 is a detail showing the starting lever and associated parts in plan, the motor shaft being shown in cross section.
Figure 6 is a detail showing a fragmentary slotted portion of the casing or handle and the exposed operating member of the starter.

The operating end of the lever has a knurled finger or thumb piece 60 which is exposed through an arcuate slot 61, (Figure 6), in the bottom wall of the handle. This end portion of the lever carries one or more rack teeth 63 which project into the oval slot 51 in position for engagement with the teeth of the pinion 50 when the lever is swung in either direction. If the points of one or both of the rack teeth 63 clash with the point or points of the pinion teeth in a manner which would lock, against further swinging movement, a lever having a fixed pivot, the slot 55 allows the lever to yield axially until its teeth are permitted to slide over the points of the pinion teeth into mesh between them and the succeeding pinion teeth. As soon as the points of the lever teeth have cleared the engaged pinion teeth, the spring 57 retracts the lever to its normal position, thereby bringing its teeth fully into mesh between the pinion teeth. While this action of the spring 57 might be referred to as a so-called "snap action," a snap action is not essential inasmuch as the lever teeth swing in an arc which carries them between unengaged teeth and the succeeding teeth under any normal condition of operation. However, the spring tends to hold the lever in its normal position, as shown in Figure 5, and to prevent an abnormal or unnecessary shifting of the lever axially when the teeth clash.

The length of the handle slot 61 is such that the lever teeth 63 will be carried into and out of mesh with the pinion teeth in a single traverse of the lever in either direction, and the spring 57 tends to hold the lever at the extremity of its stroke in either direction, thus allowing the pinion to rotate freely with the motor shaft. With the construction illustrated, I have found that a single throw of the lever in either direction will almost invariably start the motor, regardless of whether the current is an alternating current or a direct current.

Figure 7:
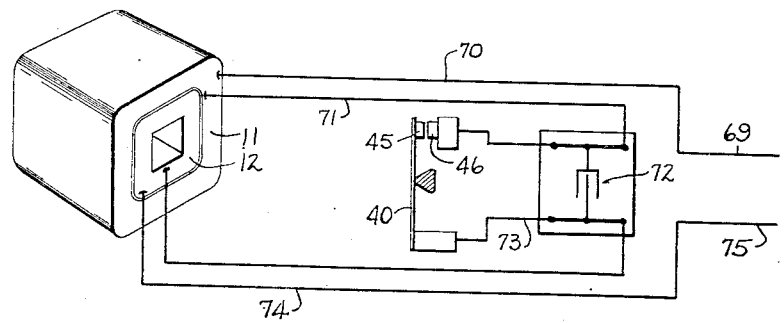
Figure 7 is an electrical diagram.

Referring to the electrical diagram shown in Figure 7, it will be observed that a circuit is established from the terminal plug 69 through the lead 70 to the outer field coil 11 and thence through the lead 71 and condenser 72 to the circuit breaker fixed contact 46, the circuit breaker arm 40, lead 73 and condenser to the inner field coil 12, and thence by lead 74 back to the terminal plug 75.

The terminal plugs, condenser, armature, field magnet, and the forward end of the vibrator lever 33 are all axially aligned within the handle, thereby providing a compact motor assembly of small cross section, and of such lineal extension that all working parts except the starting lever may be exposed by removal of the cap 36. Also, the use of the screws 20 to connect the working parts with the bottom wall of the handle casing, makes it possible to have the screw heads all exposed when the handle cap is removed, whereby the motor and associated parts may be readily detached from the bottom portion of the casing by merely removing the connecting screws.

It will be observed that the motor above described has north-south field poles, i. e., the pole 17 is of one polarity, whereas the poles 18 are of opposite polarity. There are two flux paths, and their lines of force are concentrated in the central pole of the horseshoe. It has been found that such a motor will start more quickly, attain high speed more speedily, and will operate with greater power than the motors of similar size heretofore designed to be housed in the handle of a hair clipper or other vibrator.

The arcuate polar extremities of the field poles occupy approximately 135 degrees in the circle of revolution. The arcuate faces of the field poles are of substantially the same length of arc, and area, as the corresponding faces of the armature arms.

Figure 4:
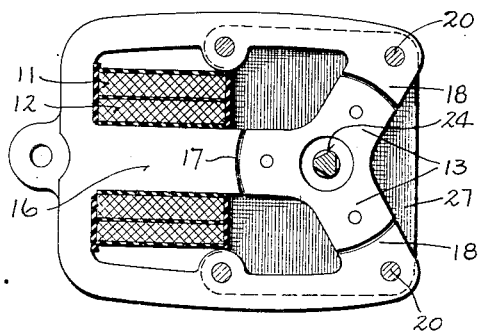
Figure 4 is a plan view of the motor, with the top removed and showing its field coil in section.

The position of the armature poles in relation to the field poles at the instant the shaft cam opens or closes the breaker points depends on the direction of armature rotation. In Figure 4, if the rotation is clockwise, the circuit closes at the instant the armature poles pass out of registry with their respective field poles.

It will be noted that the starting lever 53 has its teeth 63 located in the central portion of the oval opening or slot 51, the two teeth being substantially at opposite sides of the longitudinal center line of the lever. The arcuate slot 61 is of sufficient length to allow these teeth to not only engage the teeth of the pinion 50, but the stroke of the lever will be of sufficient length to allow the teeth 63 to move beyond the pinion, whereby when the lever completes its stroke in either direction the teeth 63 are wholly out of engagement with the pinion and the lever is held in either of its extreme positions by the spring 57, the tension of which is sufficient to prevent the lever from accidentally shifting. Due to the structure of the motor, with its north-south field poles and its self tuning interrupter spring, a single quick stroke of the starting lever is sufficient to start the motor in either direction. This is true regardless of whether the current is a direct current or alternating.

By employing wholly or partially embedded non-magnetizable nuts and bearing blocks 23, 25 and 26, the durability of the assembly is not affected by the use of relatively soft dielectric material for the casing and laminated material of high magnetic permeability for the armature.

I claim:

1. A vibrator comprising the combination with a hollow handle, a field magnet mounted therein with a magnetic core piece extending longitudinally of the handle and provided at one end with a polar extremity, the other end of said core piece being extended in horseshoe form beyond said extremity and provided with inturned polar extremities equi-distant from each other and the first mentioned polar extremity, a three pole armature having arms for simultaneous registry with the three polar extremities, and an interrupter operatively connected with the armature.

2. A vibrator comprising the combination with a hollow handle, a field magnet mounted therein with a magnetic core piece extending longitudinally of the handle and provided at one end with a polar extremity, the other end of said core piece being extended in horseshoe form beyond said extremity and provided with inturned polar extremities equi-distant from each other and the first mentioned polar extremity, a three pole armature having arms for simultaneous registry with the three polar extremities, an interrupter operatively connected with the armature, and provided with a circuit closing spring having a periodicity proportionate to the normal speed of the armature.

3. A vibrator comprising the combination with a hollow support for a vibratory member, a three pole armature mounted in the support with its poles equi-distant from each other, a field magnet having three symmetrically arranged poles in a circle concentric with the armature poles and correspondingly spaced, two of said poles being of opposite polarity from the third, an armature shaft provided with an eccentric, and a vibratory arm operatively connected to be actuated by said eccentric.

4. A vibrator comprising the combination with a hollow support for a vibratory member, a three pole armature mounted in the support with its poles equi-distant from each other, a field magnet having three symmetrically arranged poles in a circle concentric with the armature poles and correspondingly spaced, two of said poles being of opposite polarity from the third, an armature shaft provided with an eccentric, a vibratory arm operatively connected to be actuated by said eccentric, a vibratory member adapted to open and close the circuit of the field magnet, and means for actuating said member in one direction as the armature poles move out of registry with the field poles.

5. A motor having a three pole armature, and a field frame having three pole pieces symmetrically arranged with reference to the armature and provided with an energizing winding on one of them.

6. In an electric motor, a three pole field frame of horseshoe type having a short central frame member of opposite polarity to the other two, and with equi-distant pole pieces symmetrically arranged in a circle within which an armature may be mounted.

7. In an electric motor, the combination of a three pole field frame of horseshoe type having a short central pole piece of opposite polarity to the other two, and a three-armed laminated armature with which the field poles are concentric.

8. In a reversible electric motor, the combination of a laminated three-armed armature, a field frame having pole pieces concentric to the poles of the armature, an energizing winding on one of the field poles, and a vibratory member adapted to make and break the circuit in timed relationship to the movement of armature arms across the field pole faces.

9. In a mechanism of the described class, a three pole field frame having a short armed pole piece centrally disposed between the arms of the other two, and a three pole armature with which the field poles are symmetrically arranged, said short armed pole piece having an energizing winding establishing plural magnetic circuits with lines of force concentrated in the short central pole piece.

10. In a mechanism of the described class, a three pole field frame having a short armed pole piece centrally disposed between the arms of the other two, and a three pole armature with which the field poles are symmetrically arranged, said short armed pole piece having an energizing winding establishing plural magnetic circuits with lines of force concentrated in the short central pole piece, said energizing winding comprising concentric coils wound in the same direction.

11. In a mechanism of the described class, the combination of a hollow support for a vibratory member, a vibratory member mounted at one end of the support, a reversible motor having a three pole armature mounted for rotation in the plane of member vibration, said motor having a shaft extending transversely of the longitudinal axis of the support, a starting pinion mounted on one end of the motor shaft, a lever pivoted to the hollow support and adapted for rack tooth engagement with the pinion intermediately of the ends of its stroke, said lever and pinion being located within the support, and provided with an exposed lever operating member.

12. In a mechanism of the described class, the combination with a hollow handle, of a reversible motor mounted in the handle with its armature shaft transverse to the handle axis, an eccentric mounted on one end of the shaft, a vibrator lever operatively connected with the eccentric, a starting pinion mounted upon the other end of the shaft, a lever loosely pivoted within the support and adapted for rack tooth engagement with said pinion during an intermediate portion of lever movement in either direction, and means for allowing the lever to yield longitudinally while its teeth are moving into engagement with the pinion teeth, said lever having an operating piece exposed through a slot in the handle of sufficient length to allow the lever to carry its teeth into and out of engagement with the pinion during a single stroke of the lever in either direction.

13. In a mechanism of the described class, the combination with a hollow handle, of a reversible motor mounted in the handle with its armature shaft transverse to the handle axis, an eccentric mounted on one end of the shaft, a vibrator lever operatively connected with the eccentric, a starting pinion mounted upon the other end of the shaft, a lever loosely pivoted within the support and adapted for rack tooth engagement with said pinion during an intermediate portion of lever movement in either direction, and means for allowing the lever to yield longitudinally while its teeth are moving into engagement with the pinion teeth, said lever having an operating piece exposed through a slot in the handle of sufficient length to allow the lever to carry its teeth into and out of engagement with the pinion during a single stroke of the lever in either direction, said motor having a three pole armature, having two field poles of one polarity and one field pole of opposite polarity.

14. In a mechanism of the described class, the combination with a hollow handle, of a reversible motor mounted in the handle with its armature shaft transverse to the handle axis, an eccentric mounted on one end of the shaft, a vibrator lever operatively connected with the eccentric, a starting pinion mounted upon the other end of the shaft, a lever loosely pivoted within the support and adapted for rack tooth engagement with said pinion during an intermediate portion of lever movement in either direction, means for allowing the lever to yield longitudinally while its teeth are moving into engagement with the pinion teeth, said lever having an operating piece exposed through a slot in the handle of sufficient length to allow the lever to carry its teeth into and out of engagement with the pinion during a single stroke of the lever in either direction, said motor having a three pole armature, having two field poles of one polarity and one field pole of opposite polarity, and a switch for opening and closing the motor circuit timed for operation as the armature poles pass out of registry with the field poles.

15. In a mechanism of the described class, a motor having a three pole armature, concentric field poles, two of which are of one polarity and one of which is of an opposite polarity, a switch controlling an energizing circuit of the field poles and timed for operation while the armature poles are moving out of registry with the field poles, said armature having its shaft provided with cam faces for operating the switch, and the switch being provided with a non-ferrous wear plate bearing upon said cam faces, said switch being supported by a spring having vibrating periodicity corresponding with the normal periodicity of switch actuation.

16. In a mechanism of the described class, the combination with a laminated three armed armature, having its shaft provided with bearings socketed in the armature laminations, a laminated field frame of a generally horseshoe type having three polar arms, including a central short arm provided with an energizing winding, the polar face of one end and arms at the other end extending around the winding on opposite sides and having polar faces equi-distant from the first mentioned pole face, and from each other, and concentric to the armature poles, said pole faces being arcuate and occupying less than one-half of the circle in which they lie, a switch operatively connected with the armature to open and close the circuit in timed relation to movement of the armature poles out of registry with the field poles, and a resilient support for the switch adapted to vibrate in tune with the movement of the switch into and out of circuit closing position.

17. An electric motor for a vibrator mechanism, including a three-pole unwound armature mounted for rotation in a circular magnetic field defined by three equi-distant pole pieces arcuately faced in said circle, one of said pole pieces having a core provided with plural uni-directional windings, and arms extending around said windings to the other pole pieces, whereby to provide a field frame of a generally horseshoe type, having a short central frame member of opposite polarity to the other two.

18. In an electric motor for vibrators and the like, an unwound three-pole armature mounted for rotation within a circle defined by three equi-distant arcuately faced field pole pieces supported by a field frame of a generally horseshoe type, including a short arm provided with an energizing winding and carrying one of the pole pieces at one end, and a pair of arms at the other end extending in opposite directions around the winding and carrying the other two pole pieces, whereby the pole piece on the short arm will be of opposite polarity to that of the other two.

19. The combination of a hollow handle having a removable cap and containing terminal plugs, condenser, motor and vibrator lever, distributed axially within the handle in positions to be exposed by removal of the cap and having detachable connections with the handle exposed for release when the cap is removed, said motor including a three-pole unwound armature operatively connected with the vibrator lever, and a field frame of a generally horseshoe type having three equi-distant pole pieces in a circle concentric with that of armature rotation, one of the pole pieces being mounted upon the core provided with the winding and the other two being supported from the outer end of the core by side arms extending around the winding substantially as described.

MATHEW ANDIS.